United States Patent
Palan et al.

(10) Patent No.: US 10,592,920 B2
(45) Date of Patent: Mar. 17, 2020

(54) METHOD AND SYSTEM FOR TRACKING USER ENGAGEMENT ON MULTIPLE THIRD-PARTY SITES

(71) Applicant: LiveRamp, Inc., San Francisco, CA (US)

(72) Inventors: Vivek Palan, San Francisco, CA (US); Paul Owen, Bend, OR (US); Frank Ledo, Berkeley, CA (US)

(73) Assignee: LiveRamp, Inc., San Francisco, CA (US)

( * ) Notice: Subject to any disclaimer, the term of this patent is extended or adjusted under 35 U.S.C. 154(b) by 900 days.

(21) Appl. No.: 14/478,776

(22) Filed: Sep. 5, 2014

(65) Prior Publication Data

US 2015/0081423 A1 Mar. 19, 2015

Related U.S. Application Data

(60) Provisional application No. 61/879,949, filed on Sep. 19, 2013.

(51) Int. Cl.
*G06Q 30/00* (2012.01)
*G06Q 30/02* (2012.01)
(Continued)

(52) U.S. Cl.
CPC ......... *G06Q 30/0246* (2013.01); *G06Q 30/02* (2013.01); *G06Q 30/0255* (2013.01);
(Continued)

(58) Field of Classification Search
CPC ...... H04W 4/20; H04W 4/04; G06Q 30/0248; G06Q 30/0225; G06Q 30/0226;
(Continued)

(56) References Cited

U.S. PATENT DOCUMENTS 6,073,140 A    6/2000  Morgan et al.
6,334,110 B1  12/2001  Walter et al.
(Continued)

FOREIGN PATENT DOCUMENTS

WO    WO0154034      7/2001
WO    WO2007106693   9/2007
WO    20120125456 A1 9/2012

OTHER PUBLICATIONS

Karpischek; ETH Zurich; Digitaizing Consumer Options; IEEE; Nov. 1, 2010.*

(Continued)

*Primary Examiner* — Radu Andrei

(57) ABSTRACT

A system for multichannel marketing includes a redirect link that takes the place of an ordinary link to a landing page in an advertisement or interest page. A consumer activating the link is redirected momentarily to a server maintained by a marketing services provider. A cookie on the consumer's device is used to link data about this consumer to other data about the consumer that is maintained by the marketing services provider. The consumer data is held in an area where no personally identifiable information (PII) is maintained. The system allows a marketer to better track multichannel marketing efforts and to analyze the results of multichannel marketing without comprising the privacy of consumers.

14 Claims, 2 Drawing Sheets

(51) Int. Cl.
　　　*H04N 21/8358*　　　(2011.01)
　　　*H04N 21/414*　　　(2011.01)
(52) U.S. Cl.
　　　CPC ..... *G06Q 30/0269* (2013.01); *G06Q 30/0277*
　　　　(2013.01); *H04N 21/41415* (2013.01); *H04N*
　　　　　　　　　　　　　　　　　　　　*21/8358* (2013.01)
(58) Field of Classification Search
　　　CPC .... G06Q 30/06; G06Q 30/0273; G06Q 20/32;
　　　　　　　　G06Q 30/0261; G06Q 30/0231; G06Q
　　　　　　　　30/0277; G06Q 30/0269; G06Q 30/02
　　　USPC ......................................................... 705/14
　　　See application file for complete search history.

(56) References Cited

U.S. PATENT DOCUMENTS

| | | | |
|---|---|---|---|
| 6,523,041 | B1 | 2/2003 | Morgan et al. |
| 6,766,327 | B2 | 7/2004 | Morgan, Jr. et al. |
| 6,801,906 | B1* | 10/2004 | Bates ................ G06F 16/9535 |
| | | | 707/707 |
| 6,850,988 | B1 | 2/2005 | Reed |
| 7,165,105 | B2 | 1/2007 | Reiner et al. |
| 7,246,150 | B1 | 7/2007 | Donoho et al. |
| 7,337,133 | B1 | 2/2008 | Bezos et al. |
| 7,360,251 | B2 | 4/2008 | Spalink et al. |
| 7,552,069 | B2 | 6/2009 | Kepecs |
| 7,606,810 | B1* | 10/2009 | Jeavons ................ G06Q 30/02 |
| 7,698,422 | B2 | 4/2010 | Vanderhook et al. |
| 7,739,594 | B2 | 6/2010 | Vasilik |
| 7,793,342 | B1* | 9/2010 | Ebrahimi ............ H04L 63/0281 |
| | | | 713/166 |
| 7,865,829 | B1* | 1/2011 | Goldfield ................ G06F 9/453 |
| | | | 715/708 |
| 7,970,946 | B1* | 6/2011 | Djabarov ............ G06F 11/3495 |
| | | | 709/224 |
| 8,019,881 | B2 | 9/2011 | Sandhu et al. |
| 8,027,864 | B2 | 9/2011 | Gilbert |
| 8,082,332 | B2 | 12/2011 | Gilbert |
| 8,095,450 | B2 | 1/2012 | Walker et al. |
| 8,150,979 | B1 | 4/2012 | Oldham |
| 8,229,787 | B2 | 7/2012 | Ramchandani et al. |
| 8,229,959 | B1* | 7/2012 | Yagnik ................ G06F 16/9038 |
| | | | 707/782 |
| 8,234,159 | B2 | 7/2012 | Heiser, II et al. |
| 8,255,489 | B2 | 8/2012 | Afergan et al. |
| 8,271,329 | B2 | 9/2012 | Levine et al. |
| 8,302,169 | B1 | 10/2012 | Presotto et al. |
| 8,352,318 | B2 | 1/2013 | Rikhtverchik et al. |
| 8,359,236 | B1 | 1/2013 | Ranganath et al. |
| 8,499,099 | B1 | 7/2013 | Kogan |
| 8,930,204 | B1* | 1/2015 | Igoe ........................ G06Q 30/02 |
| | | | 705/2 |
| 8,949,462 | B1* | 2/2015 | Djabarov ............ H04L 63/0421 |
| | | | 709/224 |
| 8,997,076 | B1* | 3/2015 | Djabarov ............ H04L 63/029 |
| | | | 717/163 |
| 9,122,859 | B1* | 9/2015 | Djabarov ................ G06F 21/34 |
| 9,137,093 | B1* | 9/2015 | Abraham .......... H04L 29/12009 |
| 2002/0038350 | A1* | 3/2002 | Lambert ................ G06Q 30/02 |
| | | | 709/217 |
| 2003/0158960 | A1 | 8/2003 | Engberg |
| 2004/0044566 | A1 | 3/2004 | Bostelmann et al. |
| 2004/0049538 | A1* | 3/2004 | Akamatsu ............ G06Q 30/02 |
| | | | 709/203 |
| 2004/0176995 | A1 | 9/2004 | Fusz |
| 2005/0120045 | A1 | 6/2005 | Klawon |
| 2005/0177613 | A1 | 8/2005 | Dresden |
| 2007/0038516 | A1 | 2/2007 | Apple et al. |
| 2007/0067297 | A1 | 3/2007 | Kublickis |
| 2007/0130070 | A1 | 6/2007 | Williams |
| 2007/0214037 | A1 | 9/2007 | Shubert et al. |
| 2007/0219865 | A1 | 9/2007 | Leining |
| 2008/0086365 | A1 | 4/2008 | Zollino et al. |
| 2008/0086558 | A1 | 4/2008 | Bahadori et al. |
| 2008/0091535 | A1 | 4/2008 | Heiser, II et al. |
| 2008/0270398 | A1 | 10/2008 | Landau et al. |
| 2008/0313011 | A1 | 12/2008 | Rose et al. |
| 2009/0006469 | A1* | 1/2009 | Jain ........................ G06F 16/35 |
| 2009/0112978 | A1* | 4/2009 | Owen .................... G06Q 30/02 |
| | | | 709/203 |
| 2009/0187520 | A1 | 7/2009 | Liu et al. |
| 2009/0248496 | A1 | 10/2009 | Hueter et al. |
| 2009/0281895 | A1 | 11/2009 | Selinger et al. |
| 2009/0282052 | A1 | 11/2009 | Evans et al. |
| 2010/0057560 | A1 | 3/2010 | Skudlark et al. |
| 2010/0082660 | A1* | 4/2010 | Muilenburg .......... G06F 16/337 |
| | | | 707/768 |
| 2010/0268739 | A1 | 10/2010 | Zalepa |
| 2010/0287050 | A1 | 11/2010 | Jones et al. |
| 2011/0010563 | A1 | 1/2011 | Lee et al. |
| 2011/0029382 | A1 | 2/2011 | Narasimhan et al. |
| 2011/0029393 | A1 | 2/2011 | Apprendi et al. |
| 2011/0054920 | A1 | 3/2011 | Phillips et al. |
| 2011/0060905 | A1 | 3/2011 | Stack et al. |
| 2011/0078004 | A1 | 3/2011 | Swanson, Sr. |
| 2011/0178863 | A1* | 7/2011 | Daigle ............... G06Q 30/0231 |
| | | | 705/14.31 |
| 2011/0185016 | A1 | 7/2011 | Kandasamy et al. |
| 2011/0191140 | A1 | 8/2011 | Newman et al. |
| 2011/0191664 | A1 | 8/2011 | Sheleheda et al. |
| 2011/0208822 | A1* | 8/2011 | Rathod ................ G06F 16/9535 |
| | | | 709/206 |
| 2011/0258016 | A1 | 10/2011 | Barak et al. |
| 2011/0258050 | A1 | 10/2011 | Chan et al. |
| 2011/0264992 | A1 | 10/2011 | Vishria et al. |
| 2011/0270661 | A1 | 11/2011 | Heiser, II et al. |
| 2011/0276408 | A1 | 11/2011 | Toole |
| 2011/0282943 | A1 | 11/2011 | Anderson et al. |
| 2012/0023390 | A1 | 1/2012 | Howes et al. |
| 2012/0109734 | A1 | 5/2012 | Fordyce, III et al. |
| 2012/0124192 | A1* | 5/2012 | Daoud .................. G06Q 30/02 |
| | | | 709/224 |
| 2012/0150641 | A1* | 6/2012 | Dobbs .................. G06Q 30/02 |
| | | | 705/14.53 |
| 2012/0166272 | A1 | 6/2012 | Wiley et al. |
| 2012/0173345 | A1 | 7/2012 | Yanefski et al. |
| 2012/0185503 | A1 | 7/2012 | Chamberlain et al. |
| 2012/0323682 | A1 | 12/2012 | Shanbhag et al. |
| 2013/0067588 | A1 | 3/2013 | Roy et al. |
| 2013/0080242 | A1* | 3/2013 | Alhadeff ............ G06Q 30/0239 |
| | | | 705/14.39 |
| 2013/0085804 | A1 | 4/2013 | Leff et al. |
| 2013/0179440 | A1 | 7/2013 | Gordon |
| 2013/0179988 | A1 | 7/2013 | Bekker et al. |
| 2013/0013695 | A1 | 11/2013 | Jin et al. |
| 2014/0067702 | A1* | 3/2014 | Rathod .................. G06Q 10/10 |
| | | | 705/319 |
| 2014/0115710 | A1* | 4/2014 | Hughes ................ G06F 21/6245 |
| | | | 726/26 |
| 2014/0172945 | A1* | 6/2014 | Hershberg .......... H04L 67/2814 |
| | | | 709/202 |
| 2014/0278953 | A1* | 9/2014 | Ismail ................ G06Q 30/0251 |
| | | | 705/14.49 |
| 2015/0081565 | A1* | 3/2015 | Roullier ............. G06Q 30/0242 |
| | | | 705/64 |
| 2015/0341322 | A1* | 11/2015 | Levi .................... G06O 30/0269 |
| | | | 726/26 |
| 2016/0189217 | A1* | 6/2016 | Burgess ................ G06Q 30/02 |
| | | | 705/14.53 |

OTHER PUBLICATIONS

Turow; The Internet as a Testbed; MIT Press; pp. 71-98; 2008.*
Karpischek; Digitizing Consumer Opinions; IEEE 2010, 7 pages; 2010.*
Turow; The Internet as a Test Bed; IEEE; 28 pages: 2010.*
Search Report and Written Opinion for International Application No. PCT/US2014/055496 (dated Dec. 31, 2014).

(56) References Cited

OTHER PUBLICATIONS

Faber, E., Haaker, T., Bouwman, H.; Balancing Requirements for Customer Value of Mobile Services; 17the Bled eCommerce Conference eGlobal, Bled, Slovenia, Jun. 21, 2004.

Neolane Introduces New Features that Transform Anonymous Marketing Prospects into Loyal Customers; Apr. 18, 2012; Business Wire; DialogWeb.

Oracle White Paper; How to Win Online: Advanced Personalization in E-Commerce; Mar. 2011.

Andersson, F.; Hagstrom, S.; Dynamic Identities for Flexible Access Control; Master Thesis Computer Science No. MCS-2005:18; Blekinge Institute of Technology; Sweden; Aug. 2005.

Borgesius, F.; Sloot, B. V.D.; Google and Personal Data Protection; Universiteit van Amsterdam; 2012.

Pega Next Best Offer for Financial Services; Pegasystems; 2011.

www.Angoss.com; Sales and Marketing Next Best Offer, 2013.

Chang, H.; Hung, L; Ho, C.; An Anticipation Model of Potential Customers' Purchasing Behavior Based on Clustering Analysis and Association Rules Analysis; Expert Systems with Applications 32 (2007) 753-764; Elsevier.

Cutroni, J.; Merging Google Analytics with your Data Warehouse; Analytics Talk; http://cutroni.com; May 5, 2011.

Kaushik, A.; Google Analytics Visitor Segmentation: Users, Sequences, Cohorts!; Occam's Razor; www.kaushik.net; Sep. 9, 2013.

Supplementary European Search Report for Application No. 14845141.2 (corresponding to PCT/US2014/055496), datd Feb. 3, 2017.

\* cited by examiner

METHOD AND SYSTEM FOR TRACKING USER ENGAGEMENT ON MULTIPLE THIRD-PARTY SITES

CROSS-REFERENCE TO RELATED APPLICATIONS

This application claims the benefit of U.S. provisional patent application No. 61/879,949, filed on Sep. 19, 2013, and entitled "System and Method for Tracking User Engagement on Multiple Third-Party Sites." Such application is incorporated herein by reference in its entirety.

STATEMENT REGARDING FEDERALLY SPONSORED RESEARCH OR DEVELOPMENT

Not applicable.

BACKGROUND OF THE INVENTION

Consumers are accessing an increasing number of websites to expand their information about new products and services, and to make decisions about which products or services to purchase. For example, a consumer interested in fashion may first encounter a set of designer outfits on Pinterest, ask her friends on Facebook which ones they like best, search fashion blogs for more information about the designer using the Google search engine, and then finally go to a local boutique or department store to make an in-store purchase. Some of these channels are more effective than others, but it remains difficult for marketers offering goods and services to determine the combination of multiple marketing channels and messages that are most effective in converting a consumer's interest in a product or service into a purchase. The information that these marketers do get concerning these various marketing channels is limited to basic data, such as the number of visits on the landing page, or what the site owner chooses to sell to the marketer or ad agencies working with the marketer. The marketer is quite limited in its ability to link this data with data from other channels in order to gain a comprehensive view of the multichannel marketing process in which its customers and potential customers are engaged. The ability to gain further insight into the interplay between these various marketing channels may be seen as highly desirable to a marketer seeking to increase its return on investment for marketing expenditures, and to better analyze the results of its previous and current marketing campaigns.

Many marketing channels used by marketers today offer a URL "landing page" for a consumer who is interested in a product or service being described. These may be presented, for example, as a hyperlink with text such as "click here for more information" or the like. QR codes may also be used in order to encourage smartphone and tablet users to visit the landing page, since consumers using these devices may easily navigate to the desired site by directing the device's camera toward the QR code and activating the associated software to read the code. While these methods may direct a consumer to the appropriate landing page, they may not provide the marketer with information about the movement of the consumer from the original advertisement sparking the consumer's interest to the landing page. This information in particular would be of interest to marketers seeking to improve their marketing results and to perform better analytics regarding their marketing campaigns.

While additional information about consumer engagement as described above would be valuable to marketers, any use of this information must take place in a manner that is compliant with privacy laws, regulations, and industry best practices. In particular, use of personal identifying information (PII) concerning customers—such as name, address, telephone number, and email address—is tightly restricted in online transactions. Thus any attempt to better understand consumer behavior in an online, multi-channel marketing environment must ensure that PII of the consumer is not used in any manner that would compromise the privacy of the consumer.

BRIEF SUMMARY OF THE INVENTION

The present invention in certain embodiments solves the problems described above by enabling a marketer or an agency working for the marketer to capture useful data from user engagement and link that data with similar data captured from other channels, while maintaining the privacy of the consumer engaged in the marketing transaction. Certain embodiments utilize a redirect link that takes the place of an ordinary link to a landing page in an advertisement, interest page, or the like. When a consumer activates the link (such as a hyperlink, QR code, or other type of link), the consumer is redirected momentarily to a server maintained by a marketing services provider. This takes place a moment before the consumer's device is directed to the information about the product or service of interest. A cookie on the consumer's device is used to link data about this consumer to other data about the consumer that is maintained by the marketing services provider. This information is in certain embodiments limited to non-PII data, and thus the privacy of the particular consumer whose browser is redirected in this manner remains protected. The data may be built from non-PII consumer data held generally by the marketing services provider, as well as data from the marketer about its customers or prospective customers.

The invention in various embodiments may be seen to provide a number of advantages to marketers operating in a multichannel marketing environment. The marketers may derive consumer interest in a product or service from visits to interest pages and other third-party websites describing the product or service. Data beyond that known only to the marketer through consumer interactions is made available for this process. Because all PII data has been stripped away before the data is moved into a secure area for use in the invention, the marketing services provider may allow the marketer to make use of this data without a risk of loss of privacy for consumers. The advantages of the invention extend further to the analysis of a marketer's marketing campaign, such as allowing the marketer to understand better the types of consumers that are interested in a particular product or service, or a particular marketing message related to the product or service. The marketer can better track and analyze the origin of a consumer's interest in its products and services, thereby allowing a marketer to better understand the "viral" nature of content and interest. It further allows the marketer to track and better interact with those consumers who interact with its content or related third-party content.

These and other features, objects and advantages of the present invention will become better understood from a consideration of the following detailed description of certain embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In the various embodiments of the invention described herein, several parties may be involved in the multichannel marketing and analysis. These parties include a marketing services provider, who provides services that enable the tracking of user (consumer) engagement as described herein; marketers who are promoting their products or services via websites, social media sites, display advertisements, print advertisements, and packaging (such as with QR codes); agencies working for marketers in order to provide them with marketing support services (who may provide none, some, or all of the services described herein with respect to marketers); content publishers such as news, entertainment, and other websites that include advertisements in their content as, for example, a source of revenue or to advertise their own products or services (in which case they may also be marketers); and the consumers who ultimately purchase the goods and services offered by the marketers through various online and offline channels. Each of these parties may operate computing devices that are interconnected over the Internet. The marketing services provider, marketer, publisher, and agencies may use specially programmed computer servers to provide the various functionality described herein. Consumers may access the various components of this system utilizing consumer computing devices capable of accessing the Internet, including but not limited to devices such as desktop computers, laptop computers, tablets, and smartphones, as well as other types of web-connected, embedded devices, such as televisions, thermostats, and appliances. Such components are further described below with reference to FIG. 2.

Figure 1:
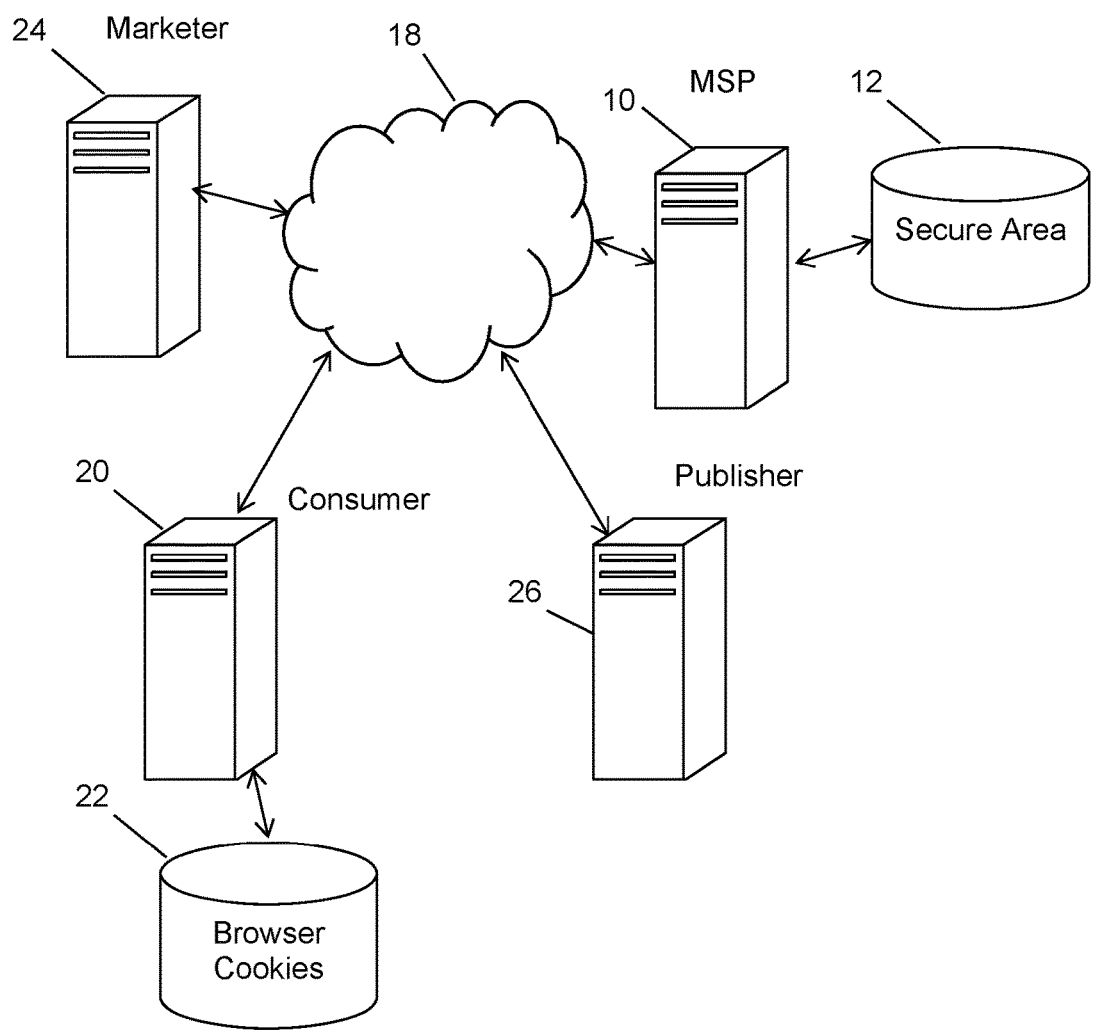
FIG. 1 is a diagram showing a networked system according to certain embodiments of the present invention.

A system for implementing the invention as described herein is depicted in FIG. 1. Marketing services provider (MSP) 10 provides a secure area 12 in which it maintains non-PII data for use of the various embodiments of the invention. Because secure area 12 contains no PII, data maintained here may be used in ways that otherwise would not be possible for online marketing transactions. Data in secure area 12 is stored in records, each of which is linked by an anonymous link. The anonymous link is not used for linking consumer data in other databases or data storage areas that include PII, even other areas operated by the MSP. In this manner, a party that gains access to the anonymous link for any consumer will be unable to use the anonymous link in order to surreptitiously identify the consumer about whom the data pertains, and cannot use the anonymous link as a means of actually identifying the individual consumer.

Prior to use of the various embodiments of the invention, secure area 12 is populated with data from one or more sources. These sources may include information collected by the MSP that may be originally placed in secure area 12 or be pulled from other databases that the MSP maintains; from the marketer to whom the MSP is providing services, such as its own internal customer database databases; from an agency representing the marketer; or from third parties that maintain their own consumer databases. This data may include, for example, many types of demographic information. In the case of information from the marketer, it may include information that would only be known by the marketer, such as how frequently a customer purchases from the marketer, or how long it has been since the consumer has purchased from the marketer. Since this information is linked only by the anonymous link and not connected with any PII after secure area 12 is populated, there is no risk of a loss of privacy for any consumer, despite the depth and breadth of data that secure area 12 may contain in various embodiments.

MSP 10 is in electronic communication over network 18 with one or more consumers 20. Consumers 20 each are communicating with MSP 10 through a consumer computing device, as described previously. The consumer computing device includes browser cookies 22 that have been accumulated through web browsing by consumer 20 are maintained. These cookies may be accessed by software associated with a website when a consumer clicks on an associated link during a web browsing session or other Internet access. MSP 10 and consumers 20 are further interconnected in electronic communication over network 18 with marketer 24 and publisher 26, each of which maintains content that is accessible by a web browser operated by each consumer 20.

There may be any number of marketers 24 who participate in the services provided by MSP 10. In various embodiments, MSP 10 may maintain separate secure areas 12 for each marketer, in order to facilitate the use of data from each marketer in processing for that particular marketer, while preventing the sharing of data between marketers or the direct or indirect use by one marketer of data provided by another marketer. This further serves to secure the privacy of consumers, in addition to the avoidance of PII in secure area 12. This feature also serves to protect sensitive competitive data that may be collected by each marketer 24, and which it must ensure is not disclosed to any third party.

There may be any number of publishers 26, such as the thousands or even millions of websites currently accessible to consumers over the Internet and which use third-party advertising as one or the only means of monetizing the content that they provide. Publishers 26 may broadly include not only those parties that operate websites that directly provide marketing information related to products and services, but also those that provide links to this information, such as social media sites that maintain online conversations between consumers.

Consumer 20 views content made available at the website or other web-accessible content of publisher 26. The consumer sees an advertisement or other matter of interest, which is associated with a link. Alternatively, the link may be presented to the consumer without the consumer previously accessing a device, such as the consumer viewing textual and/or graphical material on a physical product package or physical sign or display that also includes a QR code. In either case, the consumer uses the link in order to pursue more information about the product or service or an offer related to the product or service by following the link to the desired landing page or other web material.

Instead of taking the consumer directly to the desired landing page, the link momentarily redirects the consumer to MSP 10. This in certain embodiments takes place in a manner that is entirely transparent to the consumer and in real time so that no undue delay is caused for the consumer who desires to view the material associated with the chosen link. Once redirected to MSP 10, the new link causes the MSP to access browser cookies 22 on the consumer device in order to determine if a cookie set by the MSP is found there. This cookie, if found, is retrieved for further processing. The MSP cookie contains the anonymous link, which is used to find information in secure area 12 associated with a consumer. Setting of the MSP cookie in browser cookies 22 occurs prior to the processing described herein. In certain embodiments, the cookie found in browser cookies 22 may not contain the anonymous link directly, but may instead contain information that allows the link to be looked up in tables maintained by the MSP. In certain embodiments of the invention, other types of identifiers for the consumer or the consumer device may be used in place of a cookie from browser cookies 22. These device identifiers may include, for example, those currently used by Google, Apple, and other companies for various purposes relating to the identification of a particular web user or a particular connected device.

The cookie from browser cookies 22 is read to return the anonymous link that is associated with that consumer. The anonymous link is in certain embodiments uniquely associated in secure area 12 with a particular consumer, and thus the anonymous link enables the MSP to positively and uniquely identify consumer 20, but does so without the use of any PII related to that consumer. The term "identify" is used here in the sense of distinguishing the consumer data from data associated with others, but not to use or assign any PII such as name, address, telephone number, or email address.

The MSP redirects the consumer to marketer 24, so that the marketer can provide the "landing page" or other information of interest to the consumer. This in certain embodiments takes place very quickly after the consumer clicks on the appropriate link, and takes place in real time such that there is no appreciable delay from the point of view of the consumer. The consumer is thus not inconvenienced by the additional processing that takes place.

Using the anonymous link that was read from the cookie in the consumer's browser, then secure area 12 may be accessed using the anonymous link in order to recover any and all desired information that is maintained in secure area 12 about this consumer. The MSP records information about the transaction for later use. This allows the MSP to provide to the marketer information about how consumers access the marketer's product and service information across multiple marketing channels. This collection of information further allows the MSP to facilitate marketing campaign analysis by the marketer, either after or during a particular marketing campaign. A report may then be generated to provide this information in various forms.

It will be understood from the foregoing description that in various embodiments the present invention provides an enhanced understanding of a consumer to a marketer who has provided a product or service with a link and associated landing page to that consumer. It further provides a means for allowing the use of a wealth of consumer data, such as purchase history, demographic data, and the like, in order to better facilitate multichannel marketing, without compromising the privacy of the consumer because no PII is used. Marketers can use this understanding to re-target consumers who seek information about their products or services. It further allows marketers to better understand the sources of consumer interest in their products and services, in order to allow the marketer to more appropriately focus its marketing activities, and those of the agencies with whom it may work, on the areas most likely to show a high return on their marketing investment. It further allows marketers to better understand the "viral" nature of their marketing messages by tracking the distribution of information about their products or services through social media and related channels.

Figure 2:
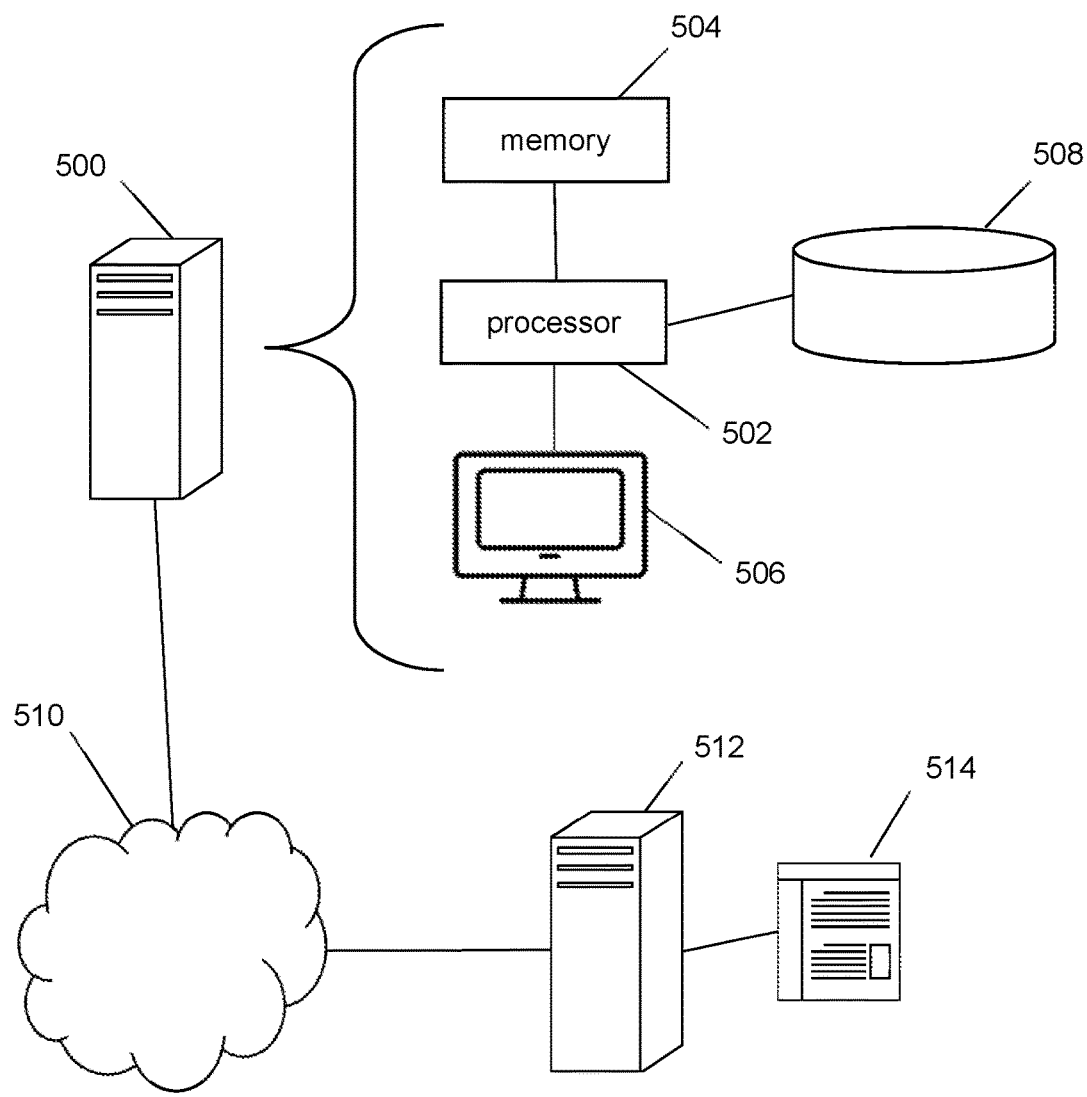
FIG. 2 is a diagram showing connected computing devices for implementing certain embodiments of the present invention.

The preferred embodiment of the invention is implemented as a number of computing devices 500 as illustrated in FIG. 2, each of which is programmed by means of instructions to result in a special-purpose computing device to perform the various functionality described herein. This is, for example, the manner in which the marketing services provider, marketer, publisher, and agencies provide their various functionality as described in the foregoing. Computing device 500 may be physically implemented in a number of different forms. For example, it may be implemented as a standard computer server as shown in FIG. 2 or as a group of servers, operating either as serial or parallel processing machines.

Computing device 500 includes in the server example of FIG. 2 microprocessor 502, memory 504, an input/output device or devices such as display 506, and storage device 508, such as a solid-state drive or magnetic hard drive. Each of these components is interconnected using various buses or networks, and several of the components may be mounted on a common PC board or in other manners as appropriate.

Microprocessor 502 may execute instructions within computing device 500, including instructions stored in memory 504. Microprocessor 502 may be implemented as a single microprocessor or multiple microprocessors, which may be either serial or parallel computing microprocessors.

Memory 504 stores information within computing device 500. The memory 504 may be implemented as one or more of a computer-readable medium or media, a volatile memory unit or units such as flash memory or RAM, or a non-volatile memory unit or units such as ROM. Memory 504 may be partially or wholly integrated within microprocessor 502, or may be an entirely stand-alone device in communication with microprocessor 502 along a bus, or may be a combination such as on-board cache memory in conjunction with separate RAM memory. Memory 504 may include multiple levels with different levels of memory 504 operating at different read/write speeds, including multiple-level caches as are known in the art.

Display 506 provide for interaction with a user, and may be implemented, for example, as an LCD (light emitting diode) or LCD (liquid crystal display) monitor for displaying information to the user, in addition to a keyboard and a pointing device, for example, a mouse, by which the user may provide input to the computer. Other kinds of devices may be used to provide for interaction with a user as well.

Various implementations of the systems and methods described herein may be realized in computer hardware, firmware, software, and/or combinations thereof. These various implementations may include implementation in one or more computer programs that are executable and/or interpretable on a programmable system including at least one programmable microprocessor 502, which may be special or general purpose, coupled to receive data and instructions from, and to transmit data and instructions to, a storage system, one or more input device, and one or more output device.

The computing system can include a consumer computing device, such as a desktop computer, laptop computer, tablet, or smartphone. In the example of FIG. 2, a desktop computer is shown. In this case, client device 512 is the consumer computing device, and runs a web browser 514 in order to access the Internet 510, which allows interconnection with computing device 500. A client and server are generally remote from each other and typically interact through a communication network.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method for tracking user engagement on multiple third-party websites, comprising the steps of:
   a. by a marketing services provider (MSP) placing a cookie at a consumer device;
   b. at some time after the cookie is placed at the consumer device, receiving at an MSP server associated with the MSP an activation of a marketer link from the consumer device in communication with a publisher device, wherein the marketer link is associated with a target marketing website, wherein the consumer device comprises a browser, the publisher device comprises a publisher website with a marketer link, and wherein the publisher website is accessible via the browser;
   c. momentarily directing the consumer device browser to the MSP server;
   d. after momentarily directing the consumer device browser to the MSP server, retrieving at the MSP server the cookie from the consumer device;
   e. redirecting the consumer device browser to the target marketing website associated with the marketer link immediately after retrieving at the MSP server the cookie; and
   f. at the MSP server, processing the retrieved cookie, wherein processing the retrieved cookie comprises the steps of:
      i. using the retrieved cookie to determine an anonymous link corresponding uniquely to the consumer associated with the consumer device associated with the retrieved cookie;
      ii. searching a secure storage area in communication with the MSP server, the secure storage area comprising a plurality of consumer records, for a record from the plurality of consumer records comprising the anonymous link; and
      iii. recording at the MSP server a transaction associated with the consumer corresponding to the anonymous link.

2. The computer-implemented method for tracking user engagement on multiple third-party websites of claim 1, wherein the secure area comprises data about consumers but does not contain personally identifiable information (PII) about the consumers.

3. The computer-implemented method for tracking user engagement on multiple third-party websites of claim 2, wherein the secure area comprises data about consumers derived from a marketer database.

4. The computer-implemented method for tracking user engagement on multiple third-party websites of claim 1, wherein steps (a) through (d) are repeated for a plurality of publishers, and further comprising the step of recording an association among transactions related to the same consumer whereby interaction by that same consumer with the plurality of publishers related to a particular product or service is recorded.

5. The computer-implemented method for tracking user engagement on multiple third-party websites of claim 1, further comprising the step of placing the marketer link on the publisher website, wherein the marketer link is associated with at least one product or service offered by a marketer.

6. The computer-implemented method for tracking user engagement on multiple third-party websites of claim 1, wherein the secure area further comprises a cookie table, and further comprising the step of searching the cookie table in order to identify an anonymous link associated with the cookie.

7. A computer-implemented method for tracking user engagement on multiple third-party websites, comprising the steps of:
   a. by a marketing services provider (MSP) placing a cookie at each of a plurality of consumer devices;
   b. at a marketing services provider (MSP) server in communication with a plurality of marketer servers, a plurality of publisher servers, and the plurality of consumer devices, receiving a marketer link activation from one of the plurality of consumer devices associated with an interested consumer, wherein the consumer devices each comprise a browser, the plurality of publisher devices each comprise a publisher website with a marketer link, and wherein each of the publisher websites is accessible via the consumer devices browsers;
   c. momentarily directing such one of the plurality of consumer device browsers to the MSP server;
   d. after momentarily directing such one of the consumer device browsers to the MSP server, retrieving at the MSP server the cookie from such one of the plurality of consumer devices associated with an interested consumer to determine an anonymous link associated with the interested consumer, wherein the anonymous link is chosen from a set of anonymous links that are different for each consumer;
   e. redirecting such one of the plurality of consumer device browsers to a target marketing website associated with the marketer link immediately after reading at the MSP server the cookie;
   f. identifying a marketer associated with the marketer link activation, and searching one of a plurality of secure storage areas in communication with the MSP server that is associated with that marketer for a record comprising the anonymous link associated with the interested consumer, wherein each of the plurality of secure storage areas comprises a plurality of records each comprising an anonymous link and consumer data; and g. recording at the MSP server a transaction associated with the interested consumer.

8. The computer-implemented method for tracking user engagement on multiple third-party websites of claim 7, wherein each of the plurality of secure areas excludes personally identifiable information (PII).

9. The computer-implemented method for tracking user engagement on multiple third-party websites of claim 7, wherein steps (a) through (d) are repeated for more than one of the plurality of publishers, and further comprising the step of recording an association between each transaction related to the identified consumer whereby interaction by the identified consumer with the more than one of the plurality of publishers related to a particular product or service provided by a provider retailer is recorded.

10. The computer-implemented method for tracking user engagement on multiple third-party websites of claim 7, further comprising the step of placing the link on a publisher site associated with one of the publisher servers, wherein the link is associated with at least one product or service offered by the marketer.

11. A computer program product for tracking user engagement on multiple third-party websites, the computer program product being stored on a non-transitory tangible computer-readable medium and comprising instructions that, when executed, cause a computer system to:

a. receive a marketer link activation from a consumer device, wherein the consumer device comprises a browser, the publisher device comprises a publisher website with a marketer link, and wherein the publisher website is accessible via the browser, wherein the link activation comprises a request to direct the consumer device browser to a target marketing website associated with the marketer link;

b. before directing the consumer device browser to the target marketing website, momentarily direct the consumer device browser to a marketing services provider (MSP) server;

c. after momentarily directing the consumer device browser to the MSP server, at the MSP server retrieve from the consumer device a cookie previously placed at the consumer device by the MSP server to determine an anonymous link corresponding uniquely to the customer;

d. redirecting the consumer device browser to the target marketing website immediately after reading at the MSP server the cookie;

e. search a secure area comprising a plurality of consumer records for a record from the plurality of consumer records comprising the anonymous link; and f. record a consumer transaction associated with the consumer corresponding to the anonymous link.

12. The computer program product for tracking user engagement on multiple third-party websites of claim 11, the computer program product further comprising instructions that, when executed, cause a computer system to repeat steps (a) through (d) for a plurality of publishers, and further record an association between each transaction related to a particular consumer whereby interaction by the consumer with a plurality of publishers related to a particular product or service is determined.

13. The computer program product for tracking user engagement on multiple third-party websites of claim 11, the computer program product further comprising instructions that, when executed, cause a computer system to place a marketer link on a publisher website.

14. The computer program product for tracking user engagement on multiple third-party websites of claim 11, the computer program product further comprising instructions that, when executed, cause a computer system to search a cookie table in order to identify an anonymous link associated with the cookie.

\* \* \* \* \*